United States Patent [19]
Anderson et al.

[11] Patent Number: 4,842,876
[45] Date of Patent: Jun. 27, 1989

[54] METHOD OF MICROWAVE HEATING OF STARCH-BASED PRODUCTS

[75] Inventors: Kathleen H. Anderson, Zimmerman; Matthew W. Lorence, Bloomington; Gwen E. DeVay, Minneapolis, all of Minn.

[73] Assignee: The Pillsbury Co., Minneapolis, Minn.

[21] Appl. No.: 213,013

[22] Filed: Jun. 29, 1988

[51] Int. Cl.[4] .................... A21D 8/06; A21D 15/02
[52] U.S. Cl. .................... 426/243; 426/524; 426/549
[58] Field of Search ............ 426/241, 243, 391, 549, 426/524; 219/10.55 M

[56] References Cited

U.S. PATENT DOCUMENTS 4,115,596  9/1978  Knutrud .................... 426/524
4,318,931  3/1982  Schiffmann et al. .......... 426/243

*Primary Examiner*—George Yeung
*Attorney, Agent, or Firm*—Robert J. Lewis

[57] ABSTRACT

A method of heating starch-based bread-like products in a microwave oven for their reheating or cooking by the control of moisture loss, cooling rate and cooling time that toughness and firmness can be reduced relative to an equivalent product.

32 Claims, 6 Drawing Sheets

Fig.-1

| ITEM | FLOUR TYPE | FAT* LEVEL (%) | WATER* (%) | FAT INCORP. METHOD | DEGREE OF DEVELOPMENT | CHARACTERISTICS |
|---|---|---|---|---|---|---|
| FRENCH ITALIAN VIENNA BREADS | HARD | 0-1.5 | 35-40 | FORMULA | HIGH | CHEWY CRUMB |
| WHITE PAN BREADS | HARD | 1.5-5.0 | 30-40 | FORMULA | HIGH | TENDER, SHORT CRUMB |
| SWEET ROLLS | HARD AND SOFT BLENDS | 10-15 | 20-30 | FORMULA | HIGH | VERY SOFT CRUMB |
| PASTRIES | HARD AND SOFT BLENDS | 30-45 | 10-25 | LAMINATION | HIGH | FLAKY, MANY LAYERS |
| PIE CRUST | SOFT | 20-40 | 16-20 | CUT INTO FORMULA | VERY LOW | FLAKY, TENDER |
| BISCUITS | HARD AND SOFT BLENDS | 2.5-20 | 20-35 | CUT INTO FORMULA OR LAMINATION | LOW-MED. | TENDER, FLAKY LAYERS |

*DOUGH WEIGHT BASIS

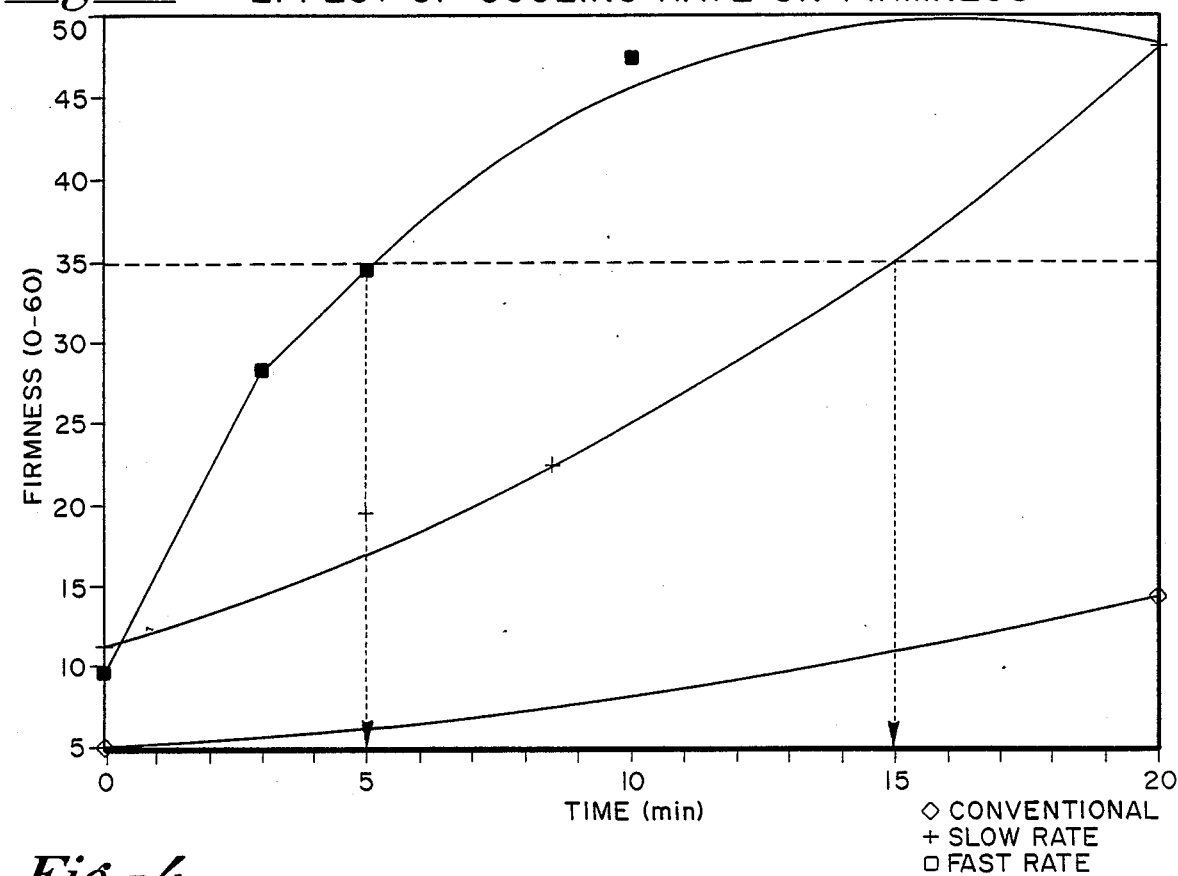
Fig.-3 EFFECT OF COOLING RATE ON FIRMNESS
◇ CONVENTIONAL
+ SLOW RATE
□ FAST RATE
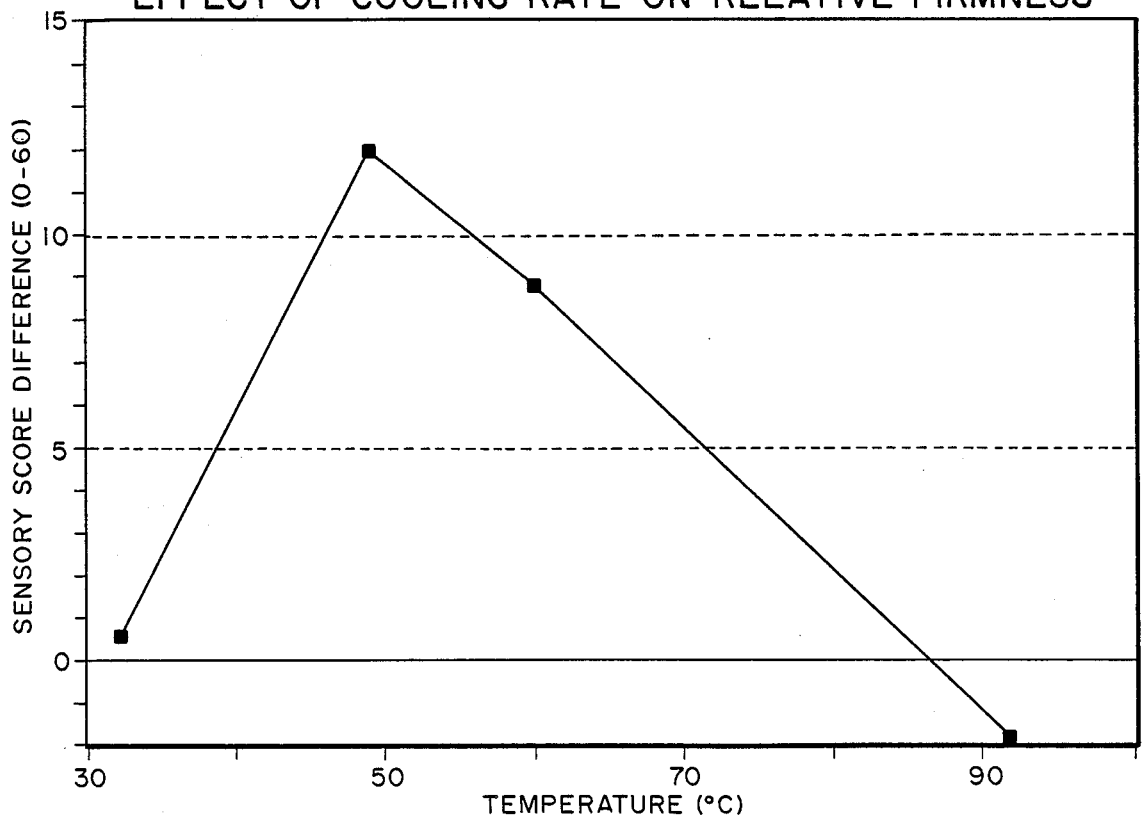
Fig.-4 EFFECT OF COOLING RATE ON RELATIVE FIRMNESS

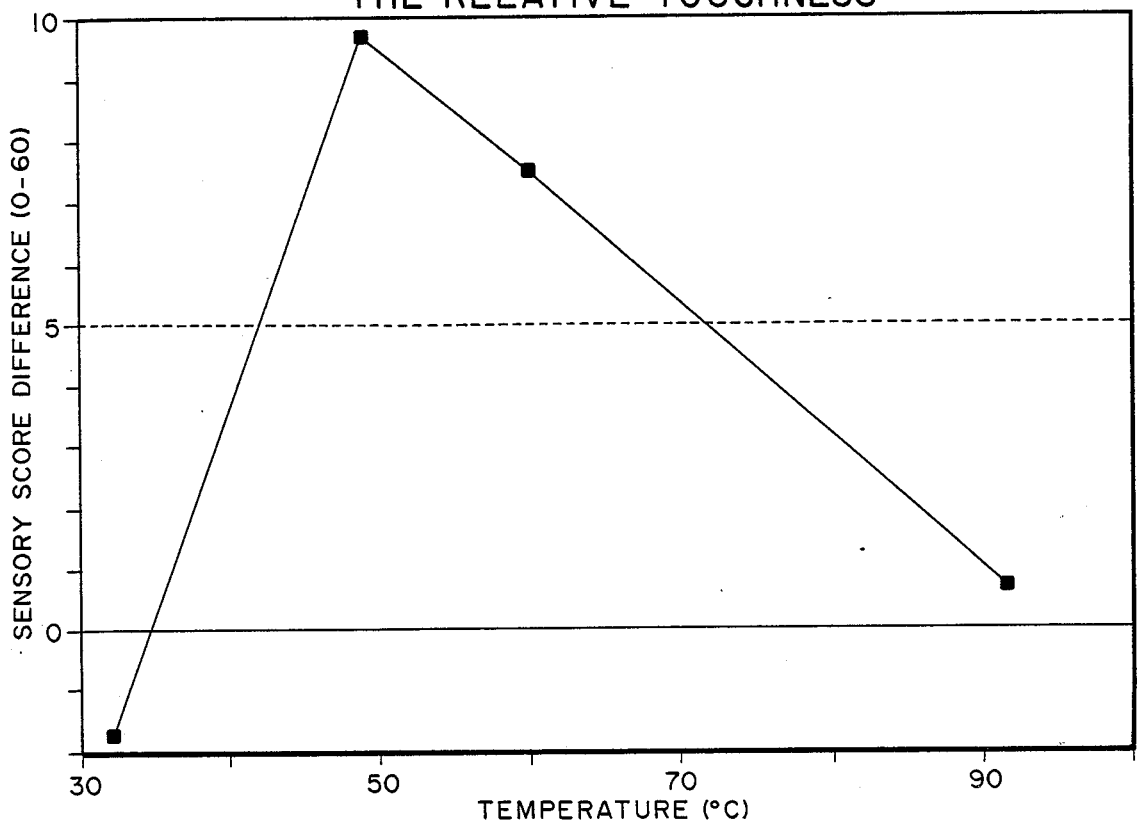
Fig.-5 EFFECT OF COOLING RATE ON THE RELATIVE TOUGHNESS
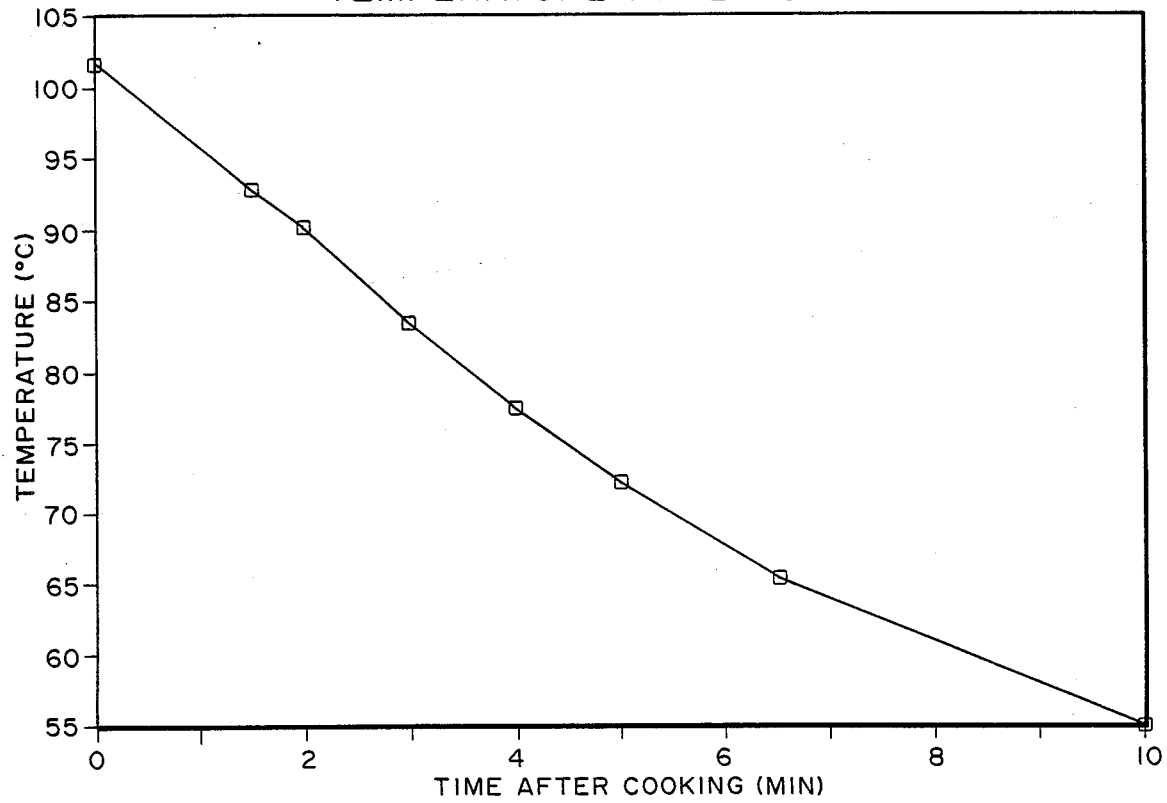
Fig.-6 TEMPERATURE AFTER COOKING

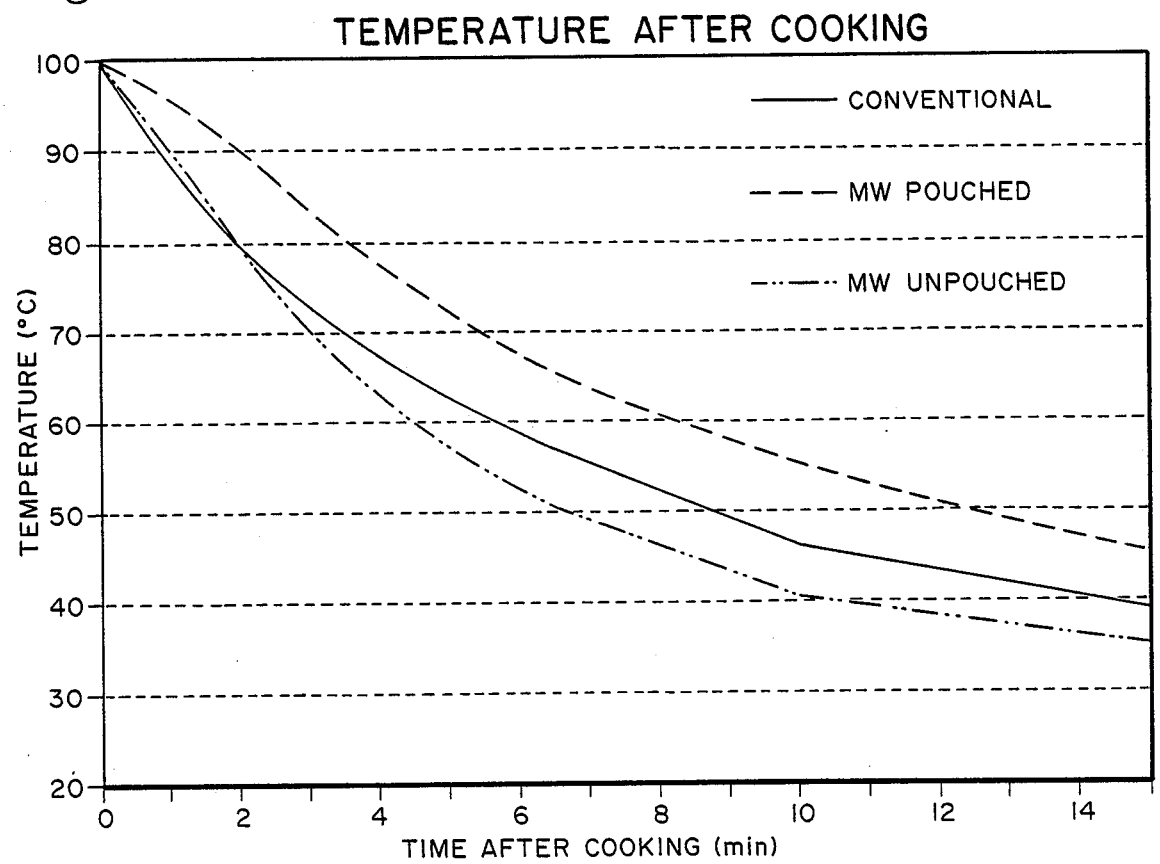

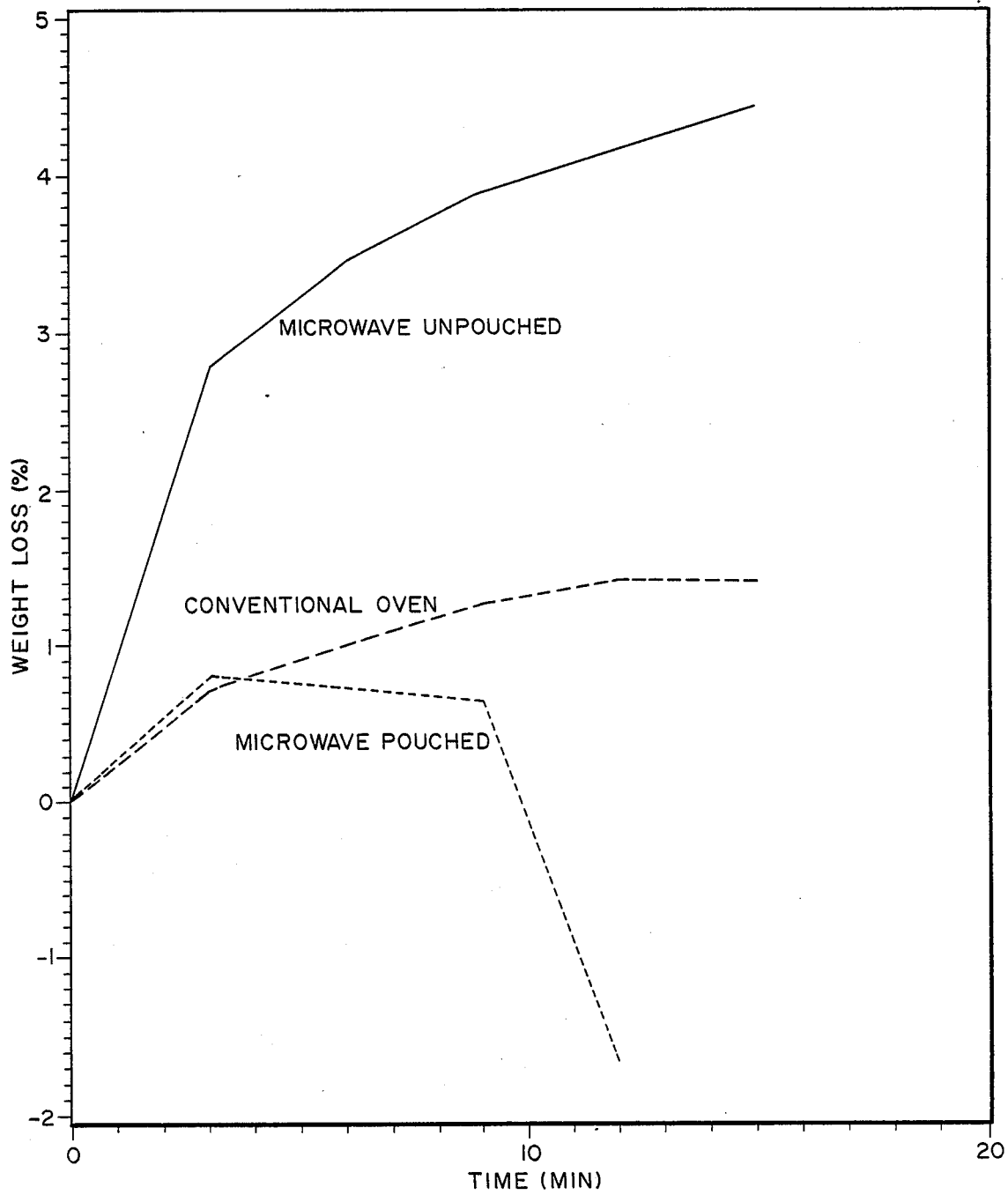

METHOD OF MICROWAVE HEATING OF STARCH-BASED PRODUCTS

BACKGROUND OF THE INVENTION

Microwaves are at the lower energy end of the electronic radiation spectrum which includes gamma rays, X-rays, ultraviolet, visible light, near infrared, infrared radiation, microwaves and radio waves. Microwave processing offers advantages over conventional oven heating for some food products because it produces rapid product heating without excessively high surface temperatures. However, this type of heating is "opposite to" conventional cooking of foods with respect to moisture and heat transfer.

Convenience is a major factor in the popularity of microwave ovens. Consumer surveys have shown that microwave market penetration has reached 70% of the households with projections for growth extending through the 1990's. Along with the increase in penetration of the microwave oven into the home has come a demand for microwaveable food products.

There has been a large expansion in the number of microwave foods available on the market. However, typically this has amounted to the inclusion of microwave directions and not food reformulations for textural attributes. Particularly in the area of bread-like foods, little, if any, improvement in textural attributes has been made in commercially available products. It has thus not been desirable to reheat or cook such products in a microwave oven. Pre-cooked and uncooked products may exhibit excessive toughness and firmness from exposure to microwave radiation.

The present invention relates to solutions for overcoming or reducing at least two problems relating to crumb texture attendant with heating pre-cooked or uncooked bread-like products in a microwave oven. Pre-cooked and uncooked bread-like products may exhibit both toughness and firmness as a result of microwave heating.

A major technical difficulty for microwaving bread-like products is the development of the above discussed unacceptable texture. The outer, crust layer may become so tough that it is difficult to tear such a product. The inner crumb may become very difficult to chew. Also, the textural quality can deteriorate much faster than that of a conventional oven baked product during the course of cooling. Overcooking in a microwave oven may exacerbate the problem while a reduction in overall cooking or reheating may reduce toughness and/or firmness.

It has been reported that Oscar Mayer & Co. developed a microwaveable sandwich by using a specific type of starch, and a precise ratio of starch to fat to flour in the dough (Anonymous, 1987). One method of dealing with texture problems is to use a specially designed protein system in the dough which has been reported not to become tough during microwave treatment (Moore, 1979). Another approach, as disclosed in U.S. Pat. No. 4,463,020, requires the use of long grain rice flour in the dough. An approach described in U.S. Pat. No. 4,560,559 requires the addition of starch granules having an average size of less than approximately 20 microns. It has been reported that fat in combination with other substances reduced toughness in microwaveable dough-based items (Kimbrell, 1987). The tenderizing effect of fat has been attributed to the "shortening effect". U.S. Pat. No. 4,015,085 for a container for the microwave heating of frozen sandwiches to F. J. Woods discloses a sandwich which is reheatable in a plastic pouch. It uses a metal shield adjacent to one surface of the sandwich. Controlled heating is accomplished by controlling the aperture size and number in the shield. There is a discussion about such products becoming unpalatable, for example, becoming rubbery to the feel and taste when heated. A moisture absorbent layer is also provided. It is disclosed that the package allows for the increase in temperature of the product from a frozen or refrigerated condition without harming the palatability of any portion of the product.

Formulas suitable for dough-based and batter-based products and other processing criteria are set forth in patent applications entitled "Starch-Based Products for Microwave Cooking or Heating" by Victor T. Huang et al. and "Dough Based Products for Microwaving" by Jean L. Weber et al. the entire disclosures of which are incorporated herein by reference. These applications were filed contemporaneously herewith.

Toughness can be defined and assessed in sensory terms as a leathery or rubbery eating texture. For example, a bagel is tough while a croissant is tender. Firmness can be defined and assessed in sensory terms as the force required to bite through the sample without tearing or pulling. A "stale" dough-based product can be characterized as firm while fresh bread immediately after conventional cooking would be considered non-firm.

Whether or not a product is tough or firm or, more accurately, is objectionably tough or firm, depends on the product type and the consumer. For example, the expectation for bread is that it should be soft and not tough. If bread had a bagel texture it would be objectionable because of the toughness. However, a bagel, even though it is tough, is not objectionable since the expectation is for a product that has a tough texture. Thus, the type of product and the consumer will set the standard for what level of toughness or firmness is objectionable, desirable.

One of the complicating factors in dealing with bread-like systems is that minor changes in the formula or process can change the product identity from one product to another product. For example, further development of a biscuit dough will produce a baked product which is more of a bread, and frying of a yeast leavened product will produce a doughnut while baking of the same yeast leavened dough will produce a bread-like product. Thus, a careful balance must be made in the Processing and the formula to solve product problems and not change the product identity.

Three criteria are the major determining factors for product identity. Those criteria are: the flour type and its protein content; the amount of fat; and the degree of dough development. See FIG. 1 for examples.

Additional factors may affect product identity. Some of these factors include, for example: type of fat; type of leavener; dough formation method; method of fat inclusion; method of cooking the product e.g., steaming, frying, baking, etc.; method of assembling the dough product, for example, laminating versus nonlaminating, etc. These and other related factors and principles are discussed in Hoseney (1986). Further, the same cereal grain can provide major differences in the product. For example, changing from a soft wheat to a hard wheat can significantly change the product identity. Dough-based and batter-based products may be prepared from one cereal grain flour or mixtures of several cereal grain flours. For dough-based products, the cereal flour should be capable of forming a viscoelastic continuous protein matrix upon hydration.

With the present invention, toughness and firmness can be reduced from any point along scales that range from non-tough and non-firm products to very firm and tough products. More specifically the present invention involves methods to reduce toughness and firmness and provides the latitude to reduce toughness and firmness regardless of the original toughness and firmness for a similar non-invention product.

The present invention involves means and method to reduce the degree of the above-mentioned toughening and/or firming of bread-like products upon their heating e.g. reheating or cooking by microwave irradiation.

Embodiments of the invention can provide improved quality in microwaveable bread-like products including unleavened and leavened products. Leavened products include those leavened by microorganisms such as yeast, chemicals, steam, etc. as is known in the art. By use of the present invention, therefore, an improved quality microwaveable product including reconstitutable dry mix, fresh or raw dough, frozen dough or pre-cooked bakery products may be prepared in the microwave oven.

The present invention can be practiced with starch containing or starch based product. These products can take the form of dough products and non-dough products. Dough products will exhibit toughness and often firmness as a textural problem. Dough-based can be defined as a product which has a continuous matrix of gluten. Preferably such products have at least 4% gluten by weight in the dry flour. More preferably a dough-based product will have 6% or more gluten by weight of dry flour. Non-dough products, hereinafter referred to as batter-based products, are characterized in that they have minimal or no gluten matrix in the plasticized mixture of flour and plasticizers. Generally, batter-based products have low gluten i.e., less than about 8% gluten by weight of dry flour, and can have no gluten. Batter-based may exhibit firmness as a result of microwave heating and not toughness because of the lack or low degree of continuous gluten matrix.

As hereinafter discussed, toughening is predominantly a protein related phenomenon, more specifically a gluten related phenomenon. Also as hereinafter discussed, firming is a predominantly starch related phenomenon. For the practice of the present invention any cereal grain based product from which a dough or batter can be made, can be utilized. Firming in these products may be improved by practice of this invention. Products containing on a dry flour basis, at least 4% gluten may utilize the invention to reduce toughening. Combinations of cereal grains can also be utilized to form a dough or batter. Cereal grains include wheat, corn, rye, barley, oats, sorghum, triticale, etc.

As used herein, the phrase bread-like product is not limited to breads as defined in the standards of identity under the Food, Drug and Cosmetic Act. Bread-like or bread-type products include such foods as breads, biscuits, cornbread, quickbreads, pastries, sweet rolls, pita bread, pie crust, pasta, dumplings, pizza crust etc. whether or not the product is made from a dough-based product or batter-based product as defined herein.

As used herein, the term "dough-based product" includes products that are partially cooked or cooked and were in a dough form just prior to cooking by any means. The term "dough-based product" also includes products that are dough prior to cooking or reheating in a microwave oven. Dough may be defined as a viscoelastic substance which is developed or partially developed.

As used herein, the term "batter-based product" includes products that are partially cooked or cooked and were in batter form just prior to cooking. The term batter based product also includes products that are batter prior to cooking or reheating in a microwave oven. Batter may be a liquid or can be a pasty material much like "brownie dough" or "cookie dough".

A product intermediate is either a dough based or batter based product in whatever form, for example, in a cooked, partially cooked or uncooked (raw) state just prior to exposure to microwave radiation.

An acceptable texture is more like the texture of a conventionally cooked equivalent or similar product as is known in the industry. Conventional cooking includes convection, conduction, non microwave irradiation like radiant heat cooking, electrical resistance heating i.e., the food product or bread-like product is used to conduct current, etc. The invention product texture is better than the texture of an equivalent product without using the invention. For purposes of this disclosure, a similar or equivalent product is a product that has substantially the same formula and is also analogously processed i.e., it is processed in the same way and pre-cooked and/or heated the same, except for use of the invention. It is preferred that the improvement in product with the invention relative to a similar product without the invention is distinguishable to a consumer and is at least about 5 and preferably at least about 10 points on a 0-60 organoleptic relative sensory testing scale (with 60 representing high toughness or firmness) using a trained panel. Such a testing procedure is known in the art. It is preferred that the improvement in the product with the invention relative to a similar or equivalent product without the invention is at least about 10% and preferably at least about 20% or more improvement on the relative sensory testing scale as described herein.

The products of the present invention comprise flour and sufficient plasticizer to form a dough or batter. The dough or batter can include aqueous and nonaqueous plasticizers. Nonaqueous plasticizers include fats however in some products added fat is not necessary for example French bread. The water content used herein, unless otherwise indicated, is added water. It is to be understood that flour contains approximately 14% water by weight of flour.

In accordance with an aspect of the present invention, an improved quality cooked or uncooked microwaveable product can be produced, such products can be distributed, and/or stored under conditions such as frozen, refrigerated (pressurized or unpressurized), and shelf-stable systems.

An advantage of the present invention is that the treatment means for the dough-based or batter-based products is effective in reducing microwave induced toughness and firmness a distinguishable amount.

Another advantage of the present invention is that the treatment means for reducing toughness and/or firmness does not require special processing equipment to effectuate.

Another advantage of the present invention is that the treatment means is effective for reducing the toughness or firmness from any level of toughness or firmness for an equivalent product that does not utilize the treatment means.

Other objects will become apparent from a review of the specification.

BRIEF DESCRIPTION OF THE DRAWINGS

FIG. 1 graphically illustrates different product identities and the corresponding product characteristics.

FIG. 3 is a graph showing the effect of cooling rate on firmness.

FIG. 4 is a graph showing the effect of cooling rate on relative firmness.

FIG. 5 is a graph showing the effect of cooling rate on relative toughness.

FIG. 6 is a graph showing a typical cooling rate for a product heated and cooled in substantially sealed plastic pouch.

FIG. 7 is a graph showing the effect of cooking treatment on cooling rate of the product.

FIG. 8 is a graph showing the effect of cooking treatment on weight loss during cooling.

SUMMARY OF THE INVENTION

Figure 2:
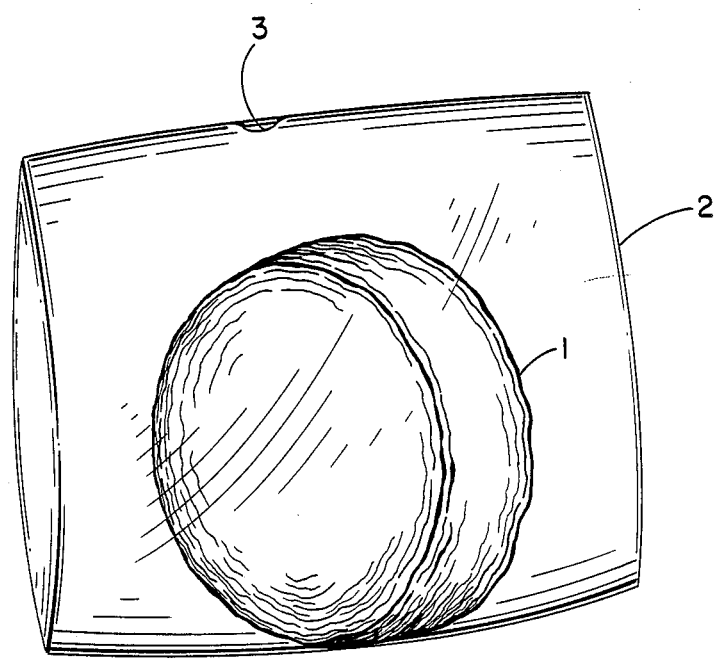
FIG. 2 illustrates a bread-like product in a plastic pouch.

The present invention provides means and methods for controlling toughening and firming in microwaved dough-based and batter-based products. As discussed above, these attributes of the product can, when not properly controlled, cause negative consumer reactions to the products.

It appears that the application of microwave energy to dough-based and batter-based products provides additional or different structures in the resulting cooked or reheated product as compared with conventionally cooked or heated products. In conventionally cooked products, structure building elements such as protein and starch interact to provide the desired structure. Microwave heating accentuates formation of or enhances this structure, which may cause textural problems. Theories are presented herein concerning potential bases of microwave-induced toughening and firming. These theories are included to more fully envision but not limit uses of the present invention but may eventually prove to be incomplete or inaccurate.

Toughness and firmness, induced by microwaving may be reduced by controlled cooling after the product is exposed to microwave radiation for heating to reheat or cook.

DETAILED DESCRIPTION OF THE INVENTION

As used herein, all percents are by weight and all measurements are at 21° C. unless otherwise specified.

Measuring of a value for toughness with mechanical measuring devices has been difficult. However, toughness can be easily measured by trained taste panels of people and can be reasonably quantified on arbitrary toughness scales. Such techniques are well known in the food industry and are generally referred to as organoleptic testing.

Firmness can be measured mechanically by a Kramer Shear Press as hereinafter described. It can also be easily measured by a trained taste panel and can be reasonably quantified on arbitrary firmness scales.

A panel of trained people was used to evaluate products. It is preferred to have at least six panelists. An initial training session was used to familiarize the panelists with the range of products that would be tested. Reference standards were presented in this session to train the panelists to recognize the differences between the product attributes that were to be measured.

The trained panel marked two reference products used as standards on a 0–60 point line scale with 0 being the low end and 60 the high end. The standards were tasted prior to each evaluation session, and were marked on the score sheets. A separate score sheet as described above was used for the test samples. No more than five test samples were marked on a given score sheet. The presentation of references at each session was used so that responses which occurred at different times could be standardized. The mean score is reported. Evaluations by Panelists which were significantly different from the remainder of the panel were eliminated from consideration. This testing procedure is more fully disclosed in "Product Testing & Sensory Evaluation of Foods" by Moskowitz.

The following major attributes were tested: firmness, toughness and moistness. Firmness was assessed by the force required to bite through the sample without tearing or pulling. Toughness was assessed as the rate of breakdown at which the sample came apart during mastication. Moistness was assessed as the degree of moist sensation perceived during mastication.

Testing by a mechanical apparatus is desirable, but because of the dynamics of eating the food products, there are variables that an apparatus does not have the ability to measure. However, the Kramer Shear Press method has proved fairly successful in measuring firmness on a relative basis for each sample set.

A Kramer Shear Press (Kramer et al., 1951) equipped with a loading cell of 500 kg for crumb samples and a 454 kg for biscuits was attached to an Instron Universal Testing Instrument (Model 1011; Canton, MA). Data were collected using computerized data collection on an IBM PC/XT connected directly to the Instron (Instron 1987). Twenty points/second were collected for crumb samples and ten points/second for biscuits. Two replicates were measured for each product.

When biscuits were tested the entire biscuit was used as the sample. When crumb samples are to be tested, they should be 4.0 ×4.0×1.5 cm and cut using a template. A crumb sample is a product sample taken from the interior section of the product with no crust. The crosshead speed was 12.7 cm/minute for crumb samples and 5.1 cm/minute for biscuits. The stress (kPa) was continuously recorded up to 200% strain.

During microwave reheating or microwave cooking, dough-based products become tough as compared to a similar or equivalent conventionally cooked or heated product. Toughening can be a major problem with these types of dough-based items and in some cases toughening is so severe that the product is not only unacceptable but is inedible. The rate of firming after heating is accelerated by microwave heating or cooking. The reasons for the accentuation of both toughening and firming is not completely understood. Firming has been found to be predominantly a starch-related phenomenon.

The present invention involves the use of a controlled environment around the product during cooling after the product is heated from a precooked state or is cooked in a microwave oven. The environmental conditions that are to be controlled are the cooling rate and environmental moisture around the product or retention of moisture in the product. The cooling rate should be low enough, the cooling time should be long enough and/or the retained moisture content should be high enough so that the product shows a distinguishable improvement in toughness and/or firmness.

The moisture around and/or in the product generally follows with the controlled cooling since controlled cooling is most effectively achieved in an enclosed container, for example a plastic pouch 2 with a pressure release vent 3. However, other means of controlling cooling rate can also be utilized, for example, the use of plastic overwrap over the product while it is on a plate. Cooling rate control can also be effected by controlled microwave power decrease after heating or cooking wherein microwave input is less than product heat loss.

Typically, biscuits are eaten in a time range of between about 5 minutes and about 15 minutes after heating or cooking. It can be seen from FIG. 3 and FIG. 7 that a microwave cooked product has a small tolerance window as it relates to the time frame within which a product should be eaten so that the product has an acceptable texture i.e. less than about 35 sensory scale units. As seen in FIG. 3, the tolerance window is about 5 minutes long and the time period is 0 to 5 minutes. The product is in the temperature range of between about 100° C. and about 57° C.

By practice of the present invention this tolerance window is expanded to 15 minutes with the time period being 0 to 15 minutes. The product temperature is in the range of 100° C. to about 36° C. It is to be noted that invention and non-invention product qualities are substantially the same when the product is first brought out of the microwave oven after heating or cooking. Also, it can be seen that the product qualities are again about the same when the product reaches room temperature whether or not the invention is practiced. However, the time frame in which the product has a better or acceptable quality level is significantly expanded.

As can be seen in FIGS. 4 and 5 the cooling rate and not just the eating temperature alone has an effect on product quality. The cooling rate can be calculated from the absolute value of the slope of ln $[(T-T_f)/(T_i-T_f)]$ versus time in minutes where T is product center temperature at any given time, $T_f$ is final product center temperature and $T_i$ is initial product center temperature out of the oven in °C. or °F. Temperatures are product center temperature as measured with a thermocouple or the like. In the examples herein, $T_f$ was normalized to 30° C. and $T_i$ was normalized to 100° C.

It is preferred that the cooling rate be less than about 0.2 min$^{-1}$ in accordance with the above formula, preferably less than about 0.15 min$^{-1}$ and most preferably less than about 0.1 min$^{-1}$. These cooling rate values, as calculated above, are based on $T_f$ being 30° C. and an initial temperature ($T_i$) of 100° C.

A statistical analysis was carried out to establish the significance of the effect of various variables on the firmness and toughness. The variables tested were: cooling time, product eating temperature, cooling rate and moisture loss. The procedure followed the standard variables selection and model building as known in the art (Montgomery and Peck, "Introduction to Linear Regression Analysis". Wiley, New York, NY. 1982). The adequacy of the model is judged by the Mallow's Cp statistic (Montgomery and Peck, 1982). The computational technique included all possible subsets regressions, and stepwise linear regression (Dixon et al., "BMDP Statistical Software". University of California Press, Berkeley, Calif. (1985) and Montgomery, D. C. and Peck, E. A., (1982).

As discussed above both cooling time (i.e. time from heating termination until eating time) and the cooling rate have an effect on product quality as it relates to firmness and toughness. A third factor provides a preferred form of the invention, that is, control of the moisture loss from the Product during cooling. Moisture loss, as reported in Table 1, is for the period from the time that the exposure to microwave radiation for heating is terminated until the product reaches 21° C. or on the basis as if it had been allowed to reach 21° C. Table 1 provides data showing the effect of these three variables. The first major improvement is the combination of controlled cooling rate and product temperature. Another significant increase is additionally provided by the control of moisture loss. The correlation coefficient, $R^2$, is equal to 0.93 for firmness when all three variables (A, C and D) are controlled in accordance with the invention. Likewise, toughness has the same control mechanisms and when all three variables are controlled in accordance with the invention the correlation coefficient is equal to 0.86.

Some of the statistical results are summarized in Table 1.

TABLE 1

| Quality Attributes | Variables | p* | Cp** | $R_p^2$ | $R^2$ |
|---|---|---|---|---|---|
| Firmness | Time (A) | 2 | 20.36 | 0.50 | |
| | Temperature (B) | 2 | 10.98 | 0.69 | |
| | Cooling rate (C) | 2 | 37.43 | 0.15 | |
| | Moisture loss (D) | 2 | 40.01 | 0.10 | |
| | A + C | 3 | 2.32 | | 0.91 |
| | B + C | 3 | 5.76 | | 0.84 |
| | A + C + D | 4 | 3.18 | | 0.93 |
| | A + B + C | 4 | 3.50 | | 0.93 |
| | A + B + C + D | 5 | 5.00 | | 0.94 |
| Toughness | Time (A) | 2 | 2.42 | 0.69 | |
| | Temperature (B) | 2 | −0.08 | 0.81 | |
| | Cooling rate (C) | 2 | 16.14 | 0.03 | |
| | Moisture loss (D) | 2 | 16.69 | 0.01 | |
| | A + C | 3 | 1.22 | | 0.85 |
| | B + D | 3 | 1.51 | | 0.83 |
| | A + C + D | 4 | 3.01 | | 0.86 |
| | A + B + C | 4 | 3.18 | | 0.85 |
| | A + B + C + D | 5 | 5.00 | | 0.83 |

*Number of variables in the model
**Mallow's Cp statistic
$R_p^2$ -Partial correlation The results clearly indicate that firmness is a function of the cooling time and the cooling rate. The high correlation coefficient (R) and the low Cp indicate that the firmness may be explained statistically principally by two variables, namely the cooling time and cooling rate.

Toughness is a function of the temperature during cooling. The cooling rate and the moisture loss contribute to reduce the toughness.

Moisture loss as used herein means the percent weight change in the total product weight from the end of heating in the microwave to the point at which the product center temperature reaches 50° C. Moisture loss for the product during cooling, as described above should be less than about 3.5% by weight of total product weight, preferably less than about 2.5% and most preferably less than about 0.5%.

Cooling time for the microwave heated product is greater than about 9 minutes, preferably greater than about 12 minutes and most preferably greater than about 15 minutes based on an initial product center temperature ($T_i$) of 100° C. and a final center temperature ($T_f$) of 50° C.

The microwave heated product is cooled to a temperature for consumption within a range of between about 38° C. and about 62° C., preferably in the range of between about 45° C. and about 60° C. and more preferably in the range of between about 53° C. and about 60° C.

It is preferred that the relative humidity around the product be substantially saturated or in the range of between about 80% and about 100% throughout the cooling cycle.

The invention is particularly useful with small products, i.e. less than about 100 grams and products with a high surface area to weight ratio, i.e. greater than about 5 cm$^2$/gm and preferably greater than about 10 cm$^2$/gm. Surface area is the total surface area of the product.

It is to be further noted that the product quality even though it shows a decline toward the end of the cooling cycle, i.e. when the product reaches approximately room temperature, 21° C., that product quality begins to increase with a long extended hold at room temperature. This can be accomplished for example by maintaining the product in the container where it will again reabsorb moisture that was driven out during heating and cooling and upon rehydration the product firmness and to a lesser degree, toughness may decrease.

The present invention can be utilized for reheating of precooked bread-like products or it can be used to cook uncooked dough-based or batter-based products.

The invention further extends to a refrigerated or frozen dough product suitable for heating or cooking by microwave irradiation, and to an edible product heated or cooked by microwave irradiation, which products have been produced using any of the methods of this invention.

The present invention is particularly useful with refrigerated dough-based products. Refrigerated dough-based products include products which are uncooked and can be stored in a pressurized or unpressurized condition. When under pressure for storage, the container gauge pressure is in the range of between about ½ to 2 atmospheres and more preferably about 1 atmosphere.

Refrigerated storage temperature is less than about 5° C. and preferably in the range of between about 0° C. and about 5° C.

The present invention is also preferred for use with frozen dough-based or batter-based products. A frozen dough or batter-based item is stored at a temperature of less than 0° C. and preferably less than about −10° C.

A preferred execution of the present invention is the cooling of the product in a plastic bag or pouch which has pressure release means. It is particularly convenient to heat the product in the container as well as cool the product in the container. FIG. 6 shows a typical cooling rate for a product heated in a substantially sealed plastic pouch and also cooled therein. This provides both for moisture retention and cooling rate.

The foregoing solutions for toughness and firmness are effected in amounts sufficient to improve the quality level as herein set forth.

The foregoing methods may be utilized to reduce microwave-induced toughness and firmness in precooked dough-based products that are reheated in the microwave oven in products which are cooked from the dough form in a microwave oven and in dry mixes that can be reconstituted into dough form and then cooked in a microwave oven.

The present invention is particularly applicable to those bread-like products which when cooked either by conventional means or microwave radiation may contain flour on a dry weight basis in an amount in the range of between about 20% and about 85% by weight of cooked products, total water in the range of between about 15% and about 45% total water by weight of cooked products and total fat in a range between 0% and about 50% by weight of cooked product. Other additional ingredients can be contained in the product as are known in the art. The products herein described in their uncooked state i.e., the batter or dough state may contain flour on a dry weight basis in the range of between about 20% and about 80% by weight of dough or batter, total water in the range of between about 18% and about 55% by weight of dough or batter and total fat in the range of 0% and about 45% by weight of dough or batter. As described above, the uncooked product can also contain additional ingredients as are known in the art.

The present invention is more effective with products that exhibit higher degrees of toughness and firmness after exposure to microwave radiation i.e. the worst the product attributes become, the more effective the invention. Typical of products that show higher degrees of textural attribute degradation are those with low fat while high fat products exhibit less toughness and firmness upon exposure to microwave radiation. For purposes of this invention the products that the invention are more usable with have less than about 10% total fat by weight of product. Another way to view this is that the invention is much more effective with those products which have a sensory score value in the range of between about 30 and 60 without the invention.

EXAMPLES

The following examples are intended to illustrate the present invention, and are not to be construed as limiting the invention in any way.

In the examples herein, except for conventionally cooked products, all products were heated with a susceptor in contact with the product and inside the pouch when a pouch was used. Those which used a pouch used a pouch made of LDPE (low density Polyethylene). The heater used was similar to those which are commercially available which use a metallized polyester adhered to a paperboard backing as are commercially available from Waldorf which had an average initial surface resistivity of approximately 138 ohms/square as measured at room temperature in a network analyzer.

For all samples in the examples, the following procedures were used unless otherwise stated:

Formula I (Table 2) was used. Dough pieces weighed 22±1 gram.

The microwaved pouched product was cooked on a metallized susceptor (heater) inside a pouch. The microwaved unpouched product was cooked on a susceptor. Cooking instructions for both were to microwave on high for 35 seconds in a Litton Generation II microwave oven at 700 watt power output. Cooking instructions for conventionally prepared product was to cook for 8 minutes in an oven at 232° C.

EXAMPLE 1

This example shows the effect of cooking treatment on product quality for biscuits as a function of cooling. Biscuits (chemically leavened) were prepared in either the microwave or conventional oven by cooking the biscuits from raw dough. The biscuits had the following formula:

TABLE 2

| FORMULA I | |
|---|---|
| Ingredients | Percent by Weight |
| Hard Wheat Flour | 57.63 |
| Water (added) | 32.52 |
| Dextrose | 4.04 |
| Shortening | 2.53 |
| SAPP | 1.51 |
| Soda | 1.11 |
| Salt | 0.66 |
| TOTAL | 100.00 |

The products were evaluated directly after cooking and again after reaching an approximate center temperature as tabulated below.

The microwaved product became dramatically more tough and more firm after cooling, while the quality of the conventionally cooked product did not change significantly.

TABLE 3

| | SENSORY SCORE | | | |
|---|---|---|---|---|
| Cooking Treatment | Sample | Center Temp (°C.) | Firmness | Toughness |
| Conventional | A | 80 | 10 | 13 |
| | B | 25 | 14 | 12 |
| Microwave | C | 80 | 10 | 19 |
| | D | 25 | 56 | 56 |

EXAMPLE 2

This example shows the effect of cooking treatment on cooling rate of the product.

Biscuits (chemically leavened) were prepared in either the microwave or conventional oven by cooking the biscuits from raw dough. Sample E was in a pouch. Sample F was cooked without a pouch. Sample G was cooked in a conventional oven.

The temperature of the center of the biscuit was recorded using a Luxtron 750 (Fluoroptic temperature measurement system) while it was cooling.

FIG. 7 shows that sample E had a lower cooling rate than G and both E and G had a lower cooling rate than F.

EXAMPLE 3

This example shows the effect of cooking treatment on weight loss during cooling.

Sample H was cooked in the microwave in a pouch. Sample I was cooked in the microwave without a pouch and Sample J was cooked in the conventional oven.

Sample H (kept in a pouch) and Samples I and J were cooled in an environment at ambient (room) temperature.

All the samples were weighed at the end of the cooking cycle and at three minute intervals while cooling. Since the pouch had to be opened to get a sample weight, a different set of biscuits was cooked and cooled for each data point measured.

FIG. 8 shows the weight loss (moisture loss) for each sample during cooling. The weight loss is considered to be all water since any other components lost would be negligible.

EXAMPLE 4

This example shows the effect of pouch cooling for chemically leavened refrigerated raw dough product.

Biscuit samples K were microwave cooked in a pouch, while sample L was cooked without a pouch. The cooked products were cooled to different center temperatures and evaluated in the same manner as those in Example I. The pouched product (K) has a lower cooling rate than the unpouched (L) product. The pouched product was judged less firm and less tough than the unpouched at both 48.9° C. and 60.0° C. There was no apparent difference between the pouched and unpouched samples at both 32.2° C. and 87.8° C. The results are tabulated as follows:

TABLE 4

| | SENSORY SCORE | | | |
|---|---|---|---|---|
| Cooking Treatment | Sample | Center Product Temp (°C.) | Firmness | Toughness |
| Pouched | K | 32.2 | 48 | 48 |
| Unpouched | L | 32.2 | 49 | 49 |
| Pouched | K | 48.9 | 23 | 27 |
| Unpouched | L | 48.9 | 35 | 37 |
| Pouched | K | 60.0 | 20 | 32 |
| Unpouched | L | 60.0 | 28 | 40 |
| Pouched | K | 87.8 | 12 | 18 |
| Unpouched | L | 87.8 | 10 | 19 |

EXAMPLE 5

This example shows the effect of cooking treatment on product quality as a function of time after cooking.

Biscuits (chemically leavened) were prepared in the microwave oven by cooking the biscuits from raw dough. Sample M was cooked in a pouch and evaluated 5 minutes after cooking. Sample N was cooked without a pouch an devaluated 5 minutes after cooking.

As shown in Example 2, the pouched product cools slower than the unpouched product and therefore at any given time after cooking would be at a higher temperature than the unpouched product until room temperature is reached.

The above described biscuits were then evaluated for toughness and moistness with the results being tabulated below.

Sample M was statistically significantly (at 95% confidence level) less firm and more moist than Sample N.

TABLE 5

| | SENSORY SCORE | | |
|---|---|---|---|
| Cooking Treatment | Sample | Firmness | Moistness |
| Pouch | M | 40 | 27 |
| Unpouched | N | 49 | 19 |

EXAMPLE 6

Shows the effect of cooking treatment on bread product quality as a function of time after cooking.

Fresh bread dough (chemically leavened) was prepared in the microwave oven by cooking the product from raw dough. The formulation used is as follows:

TABLE 6

FORMULA II

| Ingredient | Percent by Weight |
|---|---|
| Hard Wheat Flour | 54.50 |
| Water | 32.25 |
| Shortening | 4.91 |
| Gluten | 2.86 |
| Sucrose | 2.07 |
| GDL | 1.32 |
| Salt | 1.09 |
| Soda | 0.72 |
| Xanthan | 0.14 |
| SALP | 0.08 |
| Oxidants | 0.06 |
| TOTAL | 100.00 |

Sample O was cooked and cooled in a pouch and sample P was cooked and cooled without a pouch. Both samples were cooled for 10 minutes at ambient prior to testing.

The samples were evaluated by a sensory panel with the results tabulated below.

Sample O was statistically significantly (at 95% confidence level) less firm than Sample P. With respect to Toughness, Sample O was directionally less tough than Sample P.

TABLE 7

| Cooking Treatment | SENSORY SCORE | | |
|---|---|---|---|
| | Sample | Firmness | Toughness |
| Pouch | O | 25 | 38 |
| Unpouched | P | 35 | 40 |

EXAMPLE 7

This example shows the effect of cooling treatment on biscuit product quality.

From fresh dough, biscuits were cooked in a microwave. After cooking, Sample Q was wrapped in Saran wrap and Sample R was not wrapped. Both samples were cooled at ambient for 10 minutes. At the end of the 10 minute cooling period, the samples were evaluated and the results tabulated below.

Table 8 shows that Sample Q was statistically significantly (at 95% confidence level) less firm than Sample R. Sample Q was directionally less tough than Sample R.

TABLE 8

| Cooling Treatment | SENSORY SCORE | | |
|---|---|---|---|
| | Sample | Firmness | Toughness |
| Wrapped | Q | 28 | 37 |
| Unwrapped | R | 42 | 44 |

EXAMPLE 8

This example shows the effect of cooking treatment on conventionally cooked product which is reheated in the microwave.

Fresh dough biscuits were cooked in a conventional oven. After cooking, the product was cooled at ambient for 15 minutes and placed in a freezer ($-18°$ C.) for 24 hours. Sample S was reheated and cooled in a pouch and Sample T was reheated and cooled without a pouch. Both samples were reheated for 25 seconds in the microwave and cooled at ambient for 10 minutes.

The samples were evaluated by a sensory panel with the results tabulated below.

Sample S was statistically significantly (at 95% confidence level) less firm and less tough than sample T.

TABLE 9

| Cooking Treatment | SENSORY SCORE | | |
|---|---|---|---|
| | Sample | Firmness | Toughness |
| Pouch | S | 28 | 34 |
| Unpouched | T | 41 | 44 |

The entireties of the following references are incorporated herein by reference.

Anonymous, (1987) "Lot of Work and Research Went Into Zappetites Debut" *World Food & Drink Report*, Oct. 8.

Ashby, M. F., (1983) "The Mechanical Properties of Cellular Solids" *Metallurgical Transaction A*, 14A(9):1755.

Finney, K. F., (1984) "An Optimized Straight-Dough Bread-Making Method After 44 Years" *Cereal Chemist*, 61:20.

Hoseney, R. Carl "Principles of Cereal Science and Technology", *American Association of Cereal Chemists Inc.* (1986) St. Paul, Minn.

Kimbrell, W. (1987) "Microwave ovens provide new opportunities for bakery companies" *Bakery Production and Marketing*, 22(11):19.

Kramer, A., Burkhardt, G. J. and Rogers, H. P. (1951) "The Shear-Press: A Device for Measuring Food Quality" *The Canner*, 112 (5):34–40

Moore, K. (1979) "Microwave Pizza Bows in Test Market; New Protein System Makes Crispy Crust" *Food Product Development*, 13 (10):20

Rosenberg, U. and Bogl, W. (1987) "Microwave Thawing, Drying, and Baking in the Food Industry" *Food Technology*, 41 (6):85.

Schofield, J. D., Bottomley, R. C., Timms, M. F., and Booth, M. R. (1983) "The effect of heat on wheat gluten and the involvement of sulphydryl-disulphide interchange reactions". *J. Cereal Sci.*, 1:241.

Moskowitz, H. R. (1983) "Product Testing & Sensory Evaluation of Foods". *Food & Nutrition Press*, Westport, Conn.

Instron 1987, "Series IX, Materials and Testing System", *Manual M12-2-152*, Instron Corporation, Canton, MA.

Changes may be made in the construction, operation and arrangement of the various parts, elements, steps and procedures described herein without departing from the concept and scope of the invention as defined in the following claims.

What is claimed is:

1. A method for producing an edible starch-based bread-type product having a desired degree of firmness, the method comprising the steps of:

forming a dough comprising water and flour;
preparing a product intermediate from said dough;
exposing said product intermediate to microwave irradiation for a time sufficient to produce a desired edible product; and
cooling said edible product at a rate of less than about 0.2 min$^{-1}$ wherein said cooling rate is the absolute value of the slope of $\ln[(T-T_f)/(T_i-T_f)]$ versus time in minutes where T is the product center temperature at any time and the initial temperature ($T_i$)

is normalized to 100° C. and the final temperature ($T_f$) is normalized to 30° C.

2. A method as set forth in claim 1 wherein:
said product is cooled in an environment wherein moisture loss from said product is less than about 3.5% of the total weight of said product.

3. A method as set forth in claim 1 wherein:
said cooling rate is less than about 0.15 min$^{-1}$.

4. A method as set forth in claim 2 wherein:
said cooling rate is less than about 0.1 min$^{-1}$.

5. A method set forth in claim 1, 2, 3, or 4 wherein:
moisture loss from the product is less than about 2.5% of the total weight of the product.

6. A method as set forth in claim 1, 2, 3, or 4 wherein:
moisture loss from the product is less than about 0.5% of the total weight of the product.

7. A method as set forth in claim 1, 2, 3 or 4 wherein:
said product is cooled to a temperature for consumption to a temperature within the range of between about 38° C. and 8. A method as set forth in claim 1, 2, 3 or 4 wherein:
said product is cooled to a temperature for consumption to a temperature within the range of between about 45° C. and about 50° C.

9. A method as set forth in claim 1, 2, 3 or 4 wherein:
said product is cooled to a temperature for consumption to a temperature within the range of between about 53° C. and about 60° C.

10. A method as set forth in claim 1 wherein:
said product intermediate has a weight of less than about 100 grams.

11. A method as set forth in claim 1 wherein:
said product intermediate has a surface area to weight ratio greater than about 5 cm$^2$/gm.

12. A method as set forth in claim 1, 2, 3 or 4 wherein:
said product intermediate is at least partially cooked prior to exposure to microwave radiation.

13. A method as set forth in claim 1 wherein:
said product intermediate contains less than about 10% total fat by weight of product intermediate.

14. A method as set forth in claim 1 wherein:
said product intermediate is a refrigerated dough biscuit.

15. A method for producing an edible starch-based bread-type product having a desired degree of firmness, the method comprising the steps of:
forming a batter comprising water and flour;
preparing a product intermediate from said batter;
exposing said product intermediate to microwave irradiation for a time sufficient to produce a desired edible product; and
cooling said edible product at a rate of less than about 0.2 min$^{-1}$ wherein said cooling rate is the absolute value of the slope of ln $[(T-T_f)/(T_i-T_f)]$ versus time in minutes where T is the product center temperature at any time and the initial temperature ($T_i$) is normalized to 100° C. and the final temperature ($T_f$) is normalized to 30° C.

16. A method as set forth in claim 15 wherein:
said product is cooled in an environment wherein moisture loss from said product is less than about 3.5% of the total weight of said product.

17. A method as set forth in claim 16 wherein:
said cooling rate is less than about 0.15 min$^{-1}$.

18. A method as set forth in claim 17 wherein:
said cooling rate is less than about 0.1 min$^{-1}$.

19. A method as set forth in claim 15, 16 or 17 or 18 wherein:
moisture loss from the product is less than about 2.5% of the total weight of the product.

20. A method as set forth in claim 15, 16 or 17 or 18 wherein:
moisture loss from the product is less than about 0.5% of the total weight of the product.

21. A method as set forth in claim 15, 16, 17 or 18 wherein:
said product is cooled to a temperature for consumption to a temperature within the range of between about 38° C. and about 62° C.

22. A method as set forth in claim 15, 16, 17 or 18 wherein:
said product is cooled to a temperature for consumption to a temperature within the range of between about 45° C. and about 60° C.

23. A method as set forth in claim 15, 16, 17 or 18 wherein:
said product is cooled to a temperature for consumption to a temperature within the range of between about 53° C. and about 60° C.

24. A method as set forth in claim 15 wherein:
said product intermediate has a weight of less than about 100 grams.

25. A method as set forth in claim 15 wherein:
said product intermediate has a surface area to weight ratio above about 5 cm$^2$/gm.

26. A method as set forth in claim 15, 16, 17 or 18 wherein:
said product intermediate is at least partially cooked prior to exposure to microwave radiation.

27. A method as set forth in claim 15, 16, 17 or 18 wherein:
said product intermediate is uncooked batter.

28. A method as set forth in claim 15 wherein:
said product intermediate contains less than about 10% total fat by weight of product intermediate.

29. A method as set forth in claims 1, 2, 3 or 4 wherein:
said edible product is cooled for a period in excess of about 9 minutes on a 100° C. initial temperature and a 50° C. final temperature basis.

30. A method as set forth in claim 29 wherein:
said period is in excess of about 12 minutes.

31. A method as set forth in claim 29 wherein:
said period is in excess of about 15 minutes.

32. A method as set forth in claim 1, 2, 3 or 4 wherein:
said product intermediate is refrigerated dough.

* * * * *